United States Patent Office 3,835,099
Patented Sept. 10, 1974

3,835,099
PHOSPHOROUS ACID AND ESTER CATALYZED FORMATION OF AMINEDIOL MODIFIED POLYESTERS
Hideaki Munakata, Kazuo Watanabe, Yoshikazu Arimatsu, and Masakazu Tanaka, Otsu, Japan, assignors to Toyo Boseki Kabushiki Kaisha, Osaka-shi, Osaka-fu, Japan
No Drawing. Continuation of abandoned application Ser. No. 140,269, May 4, 1971. This application July 5, 1973, Ser. No. 376,715
Claims priority, application Japan, May 26, 1970, 45/45,378
Int. Cl. C08g 17/013
U.S. Cl. 260—75 N                6 Claims

ABSTRACT OF THE DISCLOSURE

In the production of a polyester improved in dyeability with acid dyes by the reaction between a carboxylic acid and a glycol of which the whole or part is the one represented by the formula:

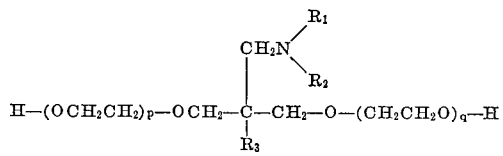

wherein $R_1$ and $R_2$ are each a lower alkyl group or, when taken together, they represent a lower alkylene group, $R_3$ is a lower alkyl group or a group of the formula:

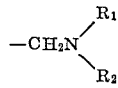

in which $R_1$ and $R_2$ are each as defined above and $p$ and $q$ are each zero or a positive integer not more than 10, an improved process which is characterized in that the reaction is carried out in the presence of at least one of phosphorous acid compounds and hypophosphorous acid, whereby (1) the rate of polymerization is elevated, (2) the sublimation of the starting carboxylic acid is prevented, (3) the molecular weight of the polyester is increased and (4) the polyester obtained is colorless and transparent.

This is a continuation of application Ser. No. 140,269, filed May 4, 1971 and now abandoned.

The present invention realtes to a process for preparing polyesters improved in dyeability with acid dyes. It also relates to a process for preparing polyesters bearing a tertiary amino group.

Aromatic linear polyesters such as polyethylene terephthalate have broadly been used as fibers and films owing to their excellent physico-chemical properties. But, those polyesters are difficultly dyeable, particularly with acid dyes. In order to improve such difficult dyeability, there has been proposed the introduction of a tertiary amino group to serve as the dye-site into them. Thus, the polycondensation of a carboxylic acid with a glycol, the whole or part of the carboxylic acid or the glycol being one bearing a tertiary amino group, or the blending of the resulting polymer into polyesters affords easily dyeable polyesters [cf. Japanese Patent Publication Nos. 2398/1963 and 25299/1964]. However, most of the tertiary amino group-bearing compounds are not sufficiently stable to heat, especially in the presence of polyesters, and occassionally color the resultant polyesters.

The present inventors previously found that tertiary amino group-containing glycols of the formula:

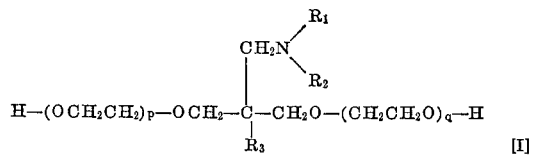

wherein $R_1$ and $R_2$ are each a lower alkyl group (e.g. methyl, ethyl, propyl, isopropyl, butyl) or, when taken together, they represent a lower alkylene group (e.g. tetramethylene, pentamethylene), $R_3$ is a lower alkyl group (e.g. methyl, ethyl, propyl, isopropyl, butyl) or a group of the formula:

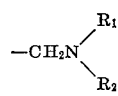

in which $R_1$ and $R_2$ are each as defined above and $p$ and $q$ are each zero or a positive integer not more than 10 are per se quite stable to heat and very slightly decomposed on the melt-extrusion of polyesters incorporated therewith as the glycol component. Thus, the introduction of the said glycols into polyesters provides polymers, of which the shaped products are less colored and have excellent affinity to acid dyes.

The production of the polyesters having the glycol [I] as the whole or part of the glycol component can be accomplished by polycondensing a carboxylic acid with a glycol of which the whole or part is the glycol [I] by a per se conventional direct esterification process. In such production, however, there is often used as the starting carboxylic acid one apt to be sublimated (e.g. terephthalic acid), and it may be sublimated at the initiation of the polycondensation which is usually effected under reduced pressure so that the reactor is clogged and the operation is made quite troublesome. In addition, the resulting polyesters need to be improved in the degree of coloration and the molecular weight.

As the result of the extensive study, it has been found that the presence of a phosphorous acid compound or hypophosphorous acid in the polycondensation of a carboxylic acid with a glycol of which the whole or part is the glycol [I] produces the following advantages: (1) the rate of polymerization is elevated; (2) no sublimation of the starting carboxylic acid is seen in the polycondensation under reduced pressure, even when a sublimative carboxylic acid such as terephthalic acid is used; (3) the molecular weight of the produced polyester is high; and (4) the produced polyester is colorless and transparent.

The present invention is based on the above new finding and directed to an improved process for production of polyesters dyeable with acid dyes.

According to the present invention, the polycondensation of a carboxylic acid with a glycol of which the whole or part is the glycol [I] is carried out in the presence of at least one of phosphorous acid compounds and hypophosphorous acid.

The term "phosphorous acid compounds" hereinabove used is intended to mean phosphorous acid and its esters such as triethyl phosphite, tristearyl phosphite, triphenyl phosphite, trisnonylphenyl phosphite, tricresyl phosphite, diethyl hydrophosphite and distearyl hydrophosphite.

The amount of the phosphorous acid compound or hypophosphorous acid to be employed is preferred to be from 0.1 to 10 mol percent on the basis of the amount of the starting carboxylic acid corresponding to the amount of the starting glycol.

Examples of the carboxylic acid are aliphatic dicarboxylic acids (e.g. adipic acid, sebacic acid) and aromatic carboxylic acids (e.g. terephthalic acid, isophthalic acid, p-hydroxybenzoic acid, naphthalenedicarboxylic acid). These carboxylic acids may be used alone or in combination.

As the glycol, there may be used the glycol [I] alone or its mixture with any other glycol such as ethylene glycol, diethylene glycol, propylene glycol, 1,3-butylene glycol, 1,4-butylene glycol, dipropylene glycol, cyclohexane-1,4-dimethanol or the like.

The glycol [I] may be prepared by various methods, of which typical ones are shown in the following scheme:

Preparation of the glycol [I: $p=q=0$; $R_3=$lower alkyl]:

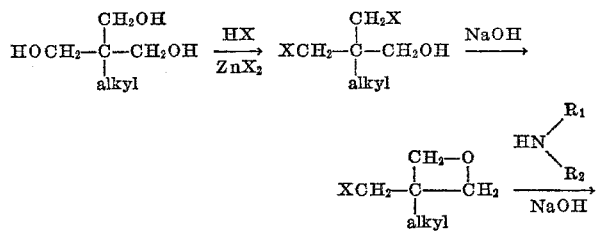

Preparation of the glycol [I: $p=q=0$; $R_3=$

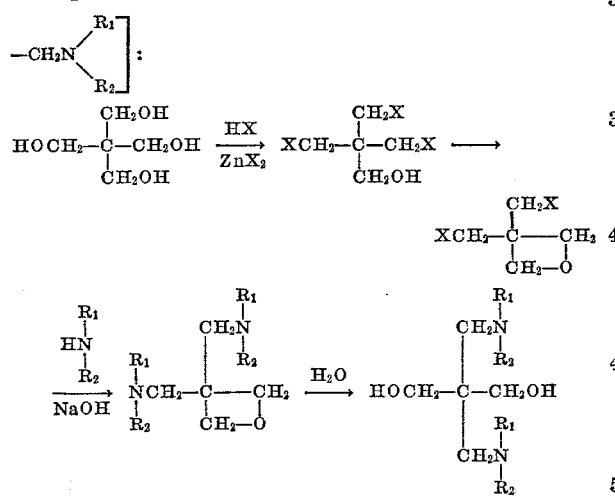

Preparation of the glycol [I: $p$ or $q\neq 0$]:

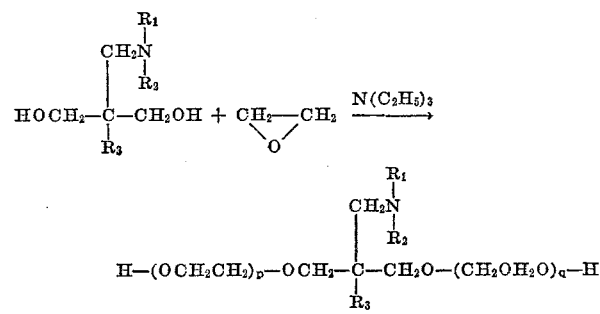

wherein X is a halogen atom (e.g. chlorine, bromine) and $R_1$, $R_2$, $R_3$, $p$ and $q$ are each as defined above.

In carrying out the process of the present invention, the carboxylic acid may be reacted with an equimolar or a little excess amount of the glycol by heating them in the presence of at least one of the phosphorous acid compounds and hypophosphorous acid in nitrogen atmosphere at a temperature from 170 to 260° C. under atmospheric or elevated pressure, during which the by-produced water is eliminated from the reaction system. After the by-production of water ceases substantially, the atmosphere is reduced and the polymerization is continued, if necessary in the presence of a polymerization catalyst.

In the above production of the polyester, there may be, if necessary, incorporated various additives such as delustering agents, stabilizers, coloration inhibitors and ultraviolet ray absorbers.

The thus produced polyester is almost colorless and transparent. It may be blended with a variety of linear polyesters so as to improve their dyeability with acid dyes. It may be also blended with polymers other than linear polyesters. Besides, it is per se useful as an adhesive, a coating material or the like.

Practical and presently preferred embodiments of the present invention are illustratively shown in the following Examples wherein parts are by weight. The molecular weight of the polyester is determined on the chloroform or benzene solution using a vapor pressure osmometer. The degree of coloration is indicated by the difference between the absorbances at 400 m$\mu$ and 550 m$\mu$ measured on a solution of the polyester (1 g.) in chloroform (10 ml.), as shown in the following formula:

$$\left(\log \frac{I_0}{I}\right) 400\ m\mu - \left(\log \frac{I_0}{I}\right) 550\ m\mu$$

Example 1

In a stainless steel made reactor equipped with an agitator, terephthalic acid (83 parts),

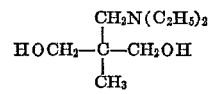

(110 parts) and a certain amount of phosphorous acid are charged, and the reaction is carried out at 210° C. for 2 hours in nitrogen atmosphere while stirring, during which the produced water is distilled out. Then, the reaction system is brought to a temperature of 230° C. and a pressure of 0.1 mm. Mg and maintained under the same conditions for 90 minutes.

The degress of coloration and the molecular weight of the thus produced polyester are shown in Table 1.

TABLE 1

| Amount of phosphorous acid added (parts) | 0 | 0.41 | 0.82 | 1.64 |
|---|---|---|---|---|
| Degree of coloration | 0.10 | 0.034 | 0.024 | 0.028 |
| Molecular weight | 2,300 | 2,790 | 2,860 | 3,120 |

From the above table, it is understood that a remarkable depression in the degree of coloration and an appreciable increase in the molecular weight are attained by the incorporation of phosphorous acid in the reaction system.

When phosphorous acid is not incorporated, unreacted terephthalic acid is sublimated at the initiation of the reaction under reduced pressure so that the operation becomes troublesome. In the case where phosphorous acid is incorporated, such an unfavorable phenomenon is not seen. Similar favorable results are also obtained by the use of hypophosphorous acid in place of phosphorous acid.

Example 2

In a stainless steel made reactor equipped with an agitator, terephthalic acid (83 parts), ethylene glycol (20 parts),

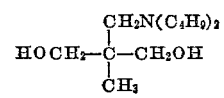

(144 parts) and a certain amount of phosphorous acid are charged, and the reaction is carried out at 220° C. for 2 hours in nitrogen atmosphere while stirring, during which the produced water is distilled out. Then, the reaction system is brought to a temperature of 240° C. and a pressure of 0.1 mm. Hg in 60 minutes.

The degree of coloration and the molecular weight of the thus produced polyester are shown in Table 2.

TABLE 2

| Amount of phosphorous acid added (parts) | 0 | 0.82 |
|---|---|---|
| Degree of coloration | 0.092 | 0.038 |
| Molecular weight | 2,560 | 3,200 |

When phosphorous acid is not incorporated, unreacted terephthalic acid is sublimated at the initiation of the reaction under reduced pressure so that the operation becomes troublesome. In the case where phosphorous acid is incorporated, such an unfavorable phenomenon is not seen.

Example 3

As in Example 1, terephthalic acid (70 parts), isophthalic acid (13 parts) and

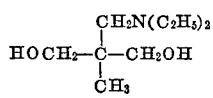

(110 parts) are reacted in the presence of triethyl phosphite (1.7 parts) whereby a polyester of 0.025 in the degree of coloration and 2900 in the molecular weight is obtained without sublimation of unreacted terephthalic acid and isophthalic acid at the initiation of the reaction under reduced pressure.

Example 4

In a stainless steel made reactor equipped with an agitator, terephthalic acid (62 parts),

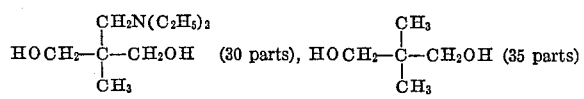

and phosphorous acid (0.55 part) are charged, and the reaction is carried out at 220° C. for 2 hours in nitrogen atmosphere while stirring, during which the produced water is distilled out. Then, the pressure of the reaction system is reduced gradually to 0.1 mm. Hg in about 30 minutes and maintained under the same condition for 90 minutes. The produced polyester is 0.085 in the degree of coloration and 4680 in the molecular weight.

When phosphorous acid is not incorporated, unreacted terephthalic acid is sublimated at the initiation of the reaction under reduced pressure so that the operation becomes troublesome.

Example 5

In a stainless steel made reactor equipped with an agitator, terephthalic acid (83 parts),

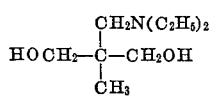

(110 parts) and hypophosphorous acid (50% aqueous solution; 1.32 parts) are charged, and the reaction is carried out at 210° C. for 2 hours in nitrogen atmosphere while stirring, during which the produced water is distilled out. Then, the reaction system is brought to a temperature of 230° C. and a pressure of 0.1 mm. Hg in about 30 minutes and maintained under the same conditions for 90 mintues. The produced polyester is 0.055 in the degree of coloration and 2830 in the molecular weight.

When hypophosphorous acid is not incorporated, unreacted terephthalic acid is sublimated at the initiation of the reaction under reduced pressure so that the operation becomes troublesome. In this case, the produced polyester is 0.10 in the degree of coloration and 2300 in the molecular weight.

Example 6

In a stainless steel made reactor equipped with an agitator, adipic acid (73 parts),

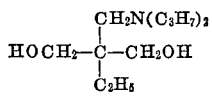

(119 parts) and phosphorous acid (0.82 part) are charged, and the reaction is carried out at 220° C. for 2 hours in nitrogen atmosphere while stirring, during which the produced water is distilled out. Then, the pressure of the reaction system is reduced gradually to 0.1 mm. Hg in about 30 minutes and maintained under the same condition for 90 minutes. The produced polyester is 0.006 in the degree of coloration and 5850 in the molecular weight.

When phosphorous acid is not incorporated, the produced polyester is 0.016 in the degree of coloration and 2350 in the molecular weight.

Example 7

In a stainless steel made reactor equipped with an agitator, sebacic acid (101 parts),

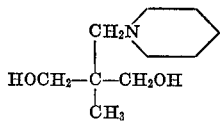

(103 parts) and distearyl hydrophosphite (5.6 parts) are charged, and the reaction is carried out at 220° C. for 2 hours in nitrogen atmosphere while stirring, during which the produced water is distilled out. Then, the pressure of the reaction system is reduced gradually to 0.1 mm. Hg in about 30 minutes and maintained under the same condition for 90 minutes. The produced polyester is 0.020 in the degree of coloration and 5170 in the molecular weight.

When distearyl hydrophosphite is not incorporated, the produced polyester is 0.060 in the degree of coloration and 2380 in the molecular weight.

Example 8

In a stainless steel made reactor equipped with an agitator, isophthalic acid (83 parts),

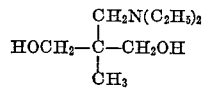

(96 parts) and hypophosphorous acid (50% aqueous solution; 1.32 parts) are charged, and the reaction is carried out at 220° C. for 2 hours in nitrogen atmosphere while stirring, during which the produced water is distilled out. Then, the pressure of the reaction system is reduced gradually to 0.1 mm. Hg in about 30 minutes and maintained under the same condition for 90 minutes. The produced polyester is 0.050 in the degree of coloration and 10630 in the molecular weight.

When hypophosphorous acid is not incorporated, the produced polyester is 0.079 in the degree of coloration and 4290 in the molecular weight.

Example 9

In a stainless steel made reactor equipped with an agitator, terephthalic acid (83 parts),

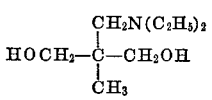

(110 parts) and triphenyl phosphite (3.1 parts) are charged, and the reaction is carried out at 210° C. for 2 hours in nitrogen atmosphere while stirring, during which the produced water is distilled out. Then, the reaction system is brought to a temperature of 230° C. and a pressure of 0.1 mm. Hg in about 30 minutes and maintained under the same conditions for 90 minutes. The produced polyester is 0.060 in the degree of coloration and 2900 in the molecular weight.

Example 10

In a stainless steel made reactor equipped with an agitator, terephthalic acid (41.5 parts), sebacic acid (50.5 parts),

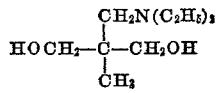

(96.3 parts) and phosphorous acid (0.82 part) are charged, and the reaction is carried out at 210° C. for 2 hours in nitrogen atmosphere while stirring, during which the produced water is distilled out. Then, the reaction system is brought to a temperature of 230° C. and a pressure of 0.1 mm. Hg and maintained under the same conditions for 90 minutes. The produced polyester is 0.032 in the degree of coloration and 6070 in the molecular weight.

When phosphorous acid is not incorporated, unreacted terephthalic acid is sublimated at the initiation of the reaction under reduced pressure so that the operation becomes troublesome. In this case, the produced polyester is 0.110 in the degree of coloration and 3890 in the molecular weight.

Example 11

The reaction is effected as in Example 4 but using a glycol of the formula:

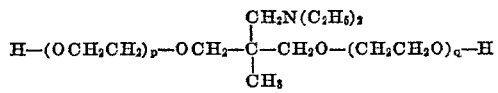

in place of

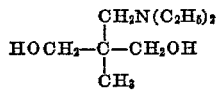

to give an almost colorless and transparent polyester. The said glycol is prepared by reacting

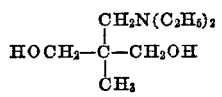

with ethylene oxide in the presence of triethylamine and distilling the reaction product under reduced pressure to collect a fraction boiling at 150 to 160° C./0.1 mm. Hg ($p+q=3$ in average).

What is claimed is:

1. In the production of a polyester improved in dyeability with acid dyes by the reaction between a carboxylic acid and a glycol of which the whole or part is the one represented by the formula:

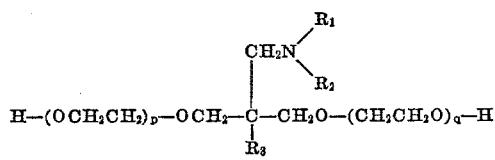

wherein $R_1$ and $R_2$ are each a lower alkyl group or, when taken together they represent a lower alkylene group, $R_3$ is a lower alkyl group or a group of the formula

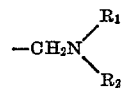

in which $R_1$ and $R_2$ are each as defined above and $p$ and $q$ are each zero or a positive integer not more than 10, an improved process which is characterized in that the catalyst used in the reaction is a member selected from the group consisting of phosphorous acid and its esters and hypophosphorous acid in an amount of 0.1 to 10 mol percent on the basis of the amount of the carboxylic acid, the esterification catalyst being present in the reaction system from the start of the reaction.

2. The process according to claim 1 wherein the catalyst is phosphorous acid.

3. The process according to claim 1 wherein the catalyst is hypophosphorous acid.

4. The process according to claim 1 wherein the catalyst is triphenyl phosphite.

5. The process according to claim 1 wherein the catalyst is distearyl hydrophosphite.

6. The process according to claim 1 wherein the catalyst is triethyl phosphite.

References Cited

UNITED STATES PATENTS 3,624,181   11/1971   Munakata et al. _____ 260—860

FOREIGN PATENTS

| 588,833 | 6/1947 | Great Britain. |
| 674,524 | 6/1952 | Great Britain. |
| 791,283 | 2/1958 | Great Britain. |
| 818,039 | 8/1959 | Great Britain. |
| 125,579 | 12/1967 | Czechoslovia. |
| 1,491,505 | 8/1967 | France. |
| 141,584 | 10/1961 | U.S.S.R. |
| 12,997 | 6/1965 | Japan. |

OTHER REFERENCES

Kirk-Othmer, *Encyl. Chem. Technol.*, Vol. 16, 176 (1968).

Galiullina et al., *Volokna Sin. Polim. 1970*, 48–51.

MELVIN GOLDSTEIN, Primary Examiner